US008548891B1

(12) United States Patent
Madere

(10) Patent No.: US 8,548,891 B1
(45) Date of Patent: Oct. 1, 2013

(54) COMPUTED-AIDED FINANCING METHOD FOR CONSOLIDATED GROUPS

(75) Inventor: Glenn L. Madere, Wayne, PA (US)

(73) Assignee: Leasehold Equities LLC, Wayne, PA (US)

( * ) Notice: Subject to any disclaimer, the term of this patent is extended or adjusted under 35 U.S.C. 154(b) by 0 days.

(21) Appl. No.: 13/552,016

(22) Filed: Jul. 18, 2012

Related U.S. Application Data

(60) Provisional application No. 61/509,453, filed on Jul. 19, 2011.

(51) Int. Cl.
G06Q 40/00 (2012.01)
(52) U.S. Cl.
USPC .......................................... 705/36 R; 705/35
(58) Field of Classification Search
USPC ........................................... 705/35, 36 R, 37
See application file for complete search history.

(56) References Cited

U.S. PATENT DOCUMENTS

| 7,295,987 | B2 * | 11/2007 | Graff | 705/313 |
|---|---|---|---|---|
| 2003/0225665 | A1 * | 12/2003 | Gross et al. | 705/36 |
| 2004/0153388 | A1 * | 8/2004 | Fisher et al. | 705/36 |
| 2007/0038539 | A1 * | 2/2007 | Gross et al. | 705/35 |
| 2008/0091476 | A1 * | 4/2008 | Graff | 705/4 |
| 2012/0323818 | A1 * | 12/2012 | Medoff | 705/36 R |

OTHER PUBLICATIONS

John R. Ezzell, Premal P. Vora, Leasing versus purchasing: Direct evidence on a corporation's motivations for leasing and consequences of leasing, The Quarterly Review of Economics and Finance 41 (2001) 33-47.*
A. Damodaran, Corporate Finance: Capital Structure and Financing Decisions, Stern School of Business, Feb. 1, 2002.*

* cited by examiner

Primary Examiner — Olabode Akintola
Assistant Examiner — Kellie Campbell
(74) Attorney, Agent, or Firm — Woodcock Washburn LLP

(57) ABSTRACT

A method for funding the purchase or construction of a real or personal property through issuing preferred stock is provided. The method includes the steps of providing a computer that is programmed to forecast multi-year financial results of a consolidated company, receiving inputs relating to market variables, and generating outputs forecasting incremental cash flow, earnings, and balance sheet liabilities to the consolidated company. The method further includes determining whether to issue common stock and preferred stock for financing a stock issuer's purchase or construction of the financed property by comparing the outputs with financial results attributable to leasing the financed property from an unrelated third party or purchasing the financed property using proceeds of a third party loan secured by the financed property.

5 Claims, 11 Drawing Sheets

COMPUTED-AIDED FINANCING METHOD FOR CONSOLIDATED GROUPS

CROSS REFERENCE TO RELATED APPLICATIONS

This application claims priority to U.S. Patent Application No. 61/509,453, filed Jul. 19, 2011, the disclosure of which is hereby incorporated by reference as if set forth in its entirety herein.

TECHNICAL FIELD

The present application is directed generally to computer aided financing methods, and in particular to computer aided methods for financing an acquisition or construction of property through issuance of preferred stock.

BACKGROUND

The notion of a consolidated group is known, and generally refers to a group of companies (usually a parent and its subsidiaries) that are merged into a larger reporting unit. Within the consolidated group, the parent company typically owns more than 50% of the common stock of the subsidiaries, and controls them. In the context of financial accounting, the consolidated group reports it operating results on a consolidated financial statement prepared under the U.S. Generally Accepted Accounting Principle (GAAP). The consolidated financial statement refers to the combined financial statements of the parent company and its subsidiaries. It presents the financial position and results of operations of the parent and its subsidiaries as if the consolidated group were a single company with one or more branches. Because the consolidated financial statement presents an aggregated look at the financial position of the consolidated group, the statement generally shows the overall health of the consolidated group as opposed to one company's stand alone position.

It is also known that the consolidated group may finance the acquisition or construction of real or personal property to be leased by one of its subsidiaries. The subsidiary that is leasing the financed property is usually both the user and lessee of the financed property. When the user leases the financed property from an unrelated third party, or purchases the financed property using in whole or part proceeds of a third party loan secured by the financed property, an imputed debt and a corresponding imputed interest charge on its consolidated financial statement arises. Such imputed debt and interest charge may result from treatment of the third party lease as a capital lease under current GAAP rules. Such treatment may also result under future GAAP rules, such as those corresponding to the Financial Accounting Standards Board's (FASB) pending proposed change to lease accounting standards (set forth in FASB Exposure Draft, Proposed Accounting Standards Update, Leases, Aug. 17, 2010 (File Reference: No. 1850-100, Leases (Topic 840)), as amended).

It is desirable to minimize or avoid use of the consolidated group's treasury cash or borrowed funds to purchase or construct a financed property while providing improved earnings and financial ratios (e.g., debt to equity) of the consolidated group, as compared to third party leasing or borrowing arrangements, such that lease obligations imputed by GAAP rules are avoided.

SUMMARY

A super-majority of funds (e.g. 70%) are raised from otherwise unaffiliated persons (preferred holders) and used to purchase or construct a financed property, thus avoiding use the consolidated group's treasury cash or borrowed funds. A principal benefit of this arrangement is improvement to the earnings and financial ratios (e.g., debt-to-equity) of the consolidated group when compared to a third party lease of, or borrowed funds to purchase, the financed property. Such improved financial results follow from the fact that internal rent, which constitutes an obligation between members of the same consolidated group, is eliminated in determining net earnings of the group and is not treated as a lease obligation of the consolidated group for GAAP purposes.

The present invention provides a method of funding the acquisition or construction of real or personal property through issuance of preferred stock. The financed property is leased to a user, which is a subsidiary company in a consolidated group. Preferred stock is issued by an issuer, also a subsidiary company in the consolidated group, and the lessor of the financed property. The issuer, the user, and a parent company are within the consolidated company.

The method includes the steps of providing a computer that is programmed to forecast multi-year financial results, receiving inputs for computer calculation, generating outputs representing the multi-year financial projections, and determining whether to issue stock to finance the purchase or construction of the financed property.

The computer inputs are first electronic records stored in the computer that represent: (i) square footage and cost per square foot of the financed property; (ii) market net rental rate for the financed property; (iii) period for resetting rents under one of a competing third party lease or an underlying third party lease; (iv) market rental growth rate; (v) discount rate; (vi) the preferred stock dividend rate; (vii) an amount of equity capital to be contributed to the issuer by one or more entities within the consolidated company; and, (viii) financing fees and costs for issuing the preferred stock.

The computer outputs are second electronic records that represent multi-year financial projections and that define: (i) rents to be paid by the user under the lease between the user and the issuer; (ii) an amount of capitalization required to be provided through issuance of the preferred stock; and, (iii) an effect measured by net earnings, net cash flow, and balance sheet liabilities of the consolidated company, in comparison to the corresponding effect of either a third party lease or mortgage financing.

After the second electronic records are generated, the consolidated group or a financial advisor compares the second electronic records with financial results that would obtain if the user were to (i) lease the financed property from an unrelated third party (third party lease) or (ii) purchase the financed property using in whole or part proceeds of a third party loan secured by the financed property (mortgage financing). Based upon the comparison, the consolidated group or the financial advisor determines whether to issue common stock to the parent company and preferred stock to investors outside the consolidated group for financing the issuer's purchase or construction of the financed property.

The preferred stock issued to outside investors is subject to an optional redemption by the issuer before a useful life of the financed property expires. The internal lease between the issuer and the user also requires the user to provide a sufficient amount of rent payment so that the issuer can fund the payment of dividends and planned optional redemption payments on the preferred stock. There is further provided a covenant from the issuer. As long as the preferred stock is outstanding, holders of the preferred stock may enforce the covenant. The covenant prohibits a sale or encumbrance of the financed property without either (i) consent of a majority of the shareholders of the preferred stock, or, (ii) placing the issuer's proceeds from the sale or encumbrance of the financed property in a trust or restricted account for the benefit of the holders of the preferred stock.

The consolidated group's use of the method of the present invention to purchase or construct the financed property through issuing preferred stock avoids the creation of imputed debt and a corresponding imputed interest charge on its consolidated financial statement, improving the earnings and financial ratios (e.g., debt-to-equity) of the consolidated group.

DETAILED DESCRIPTION OF ILLUSTRATIVE EMBODIMENTS

Figure 1:
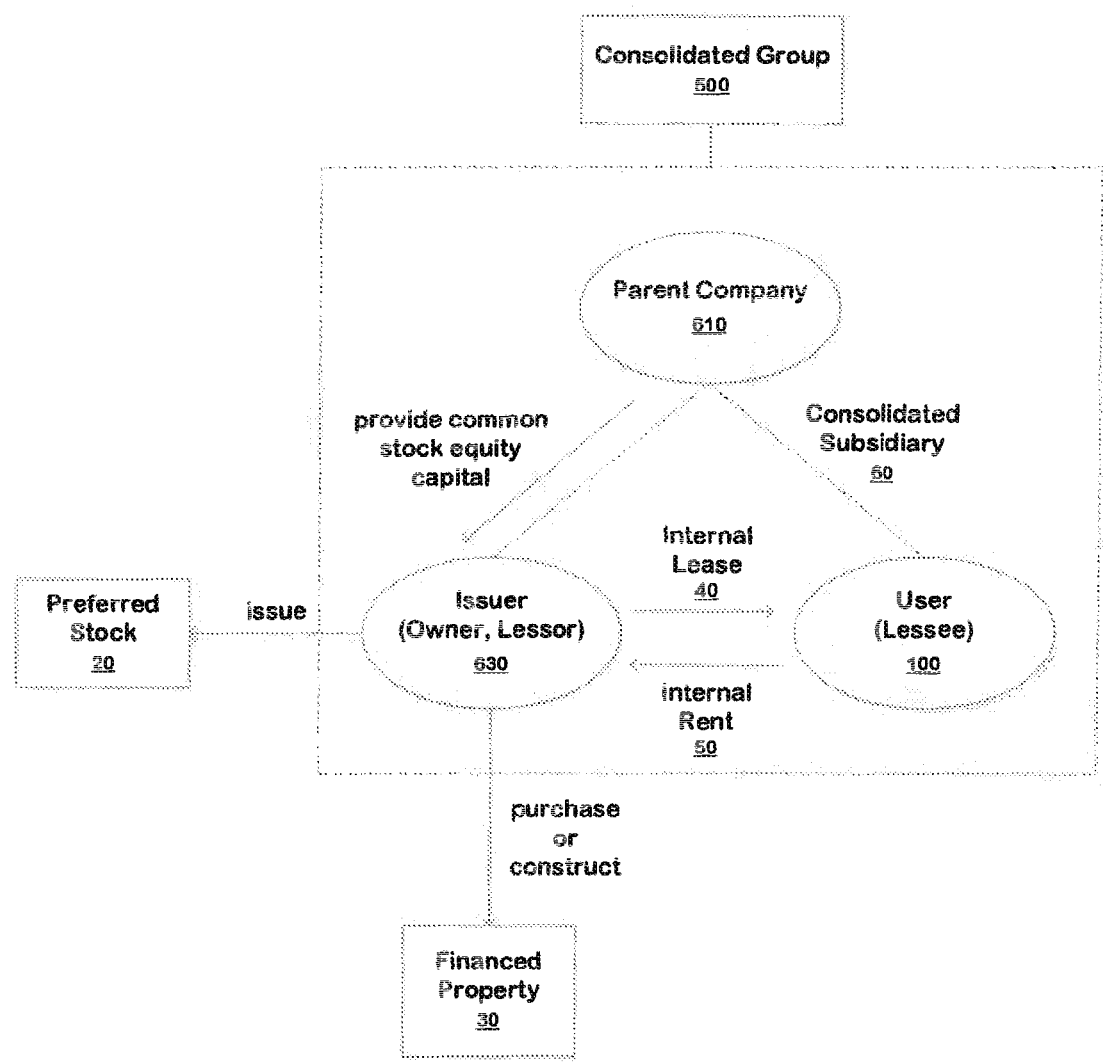
FIG. 1 illustrates a method of funding the purchase or construction of leasehold improvements or other financed property according to an embodiment of the present invention.

Referring to the drawings, wherein like numerals represent like elements, there is shown the Figures exemplary embodiments of funding the purchase or construction of real or personal property for business use by issuing special purpose preferred stock.

With reference to FIG. 1, financed property 30 is leased between two affiliated companies 100 and 630 that are members of the same consolidated group 500 that reports its operating results on a consolidated financial statement (consolidated financial) prepared under U.S. Generally Accepted Accounting Principles (GAAP). One such affiliated company is user/lessee 100 of the financed property 30, while the other affiliated company is the owner/lessor 630 of the financed property 30. Affiliated company 630 is also the issuer of preferred stock 20. Both the user 100 and the issuer 630 thus define a consolidated subsidiary 60 of the parent company 610. A lease 40 between the issuer 630 and the user 100 defines an internal lease, and rent 50 paid under the internal lease 40 defines internal rent.

Figure 2:
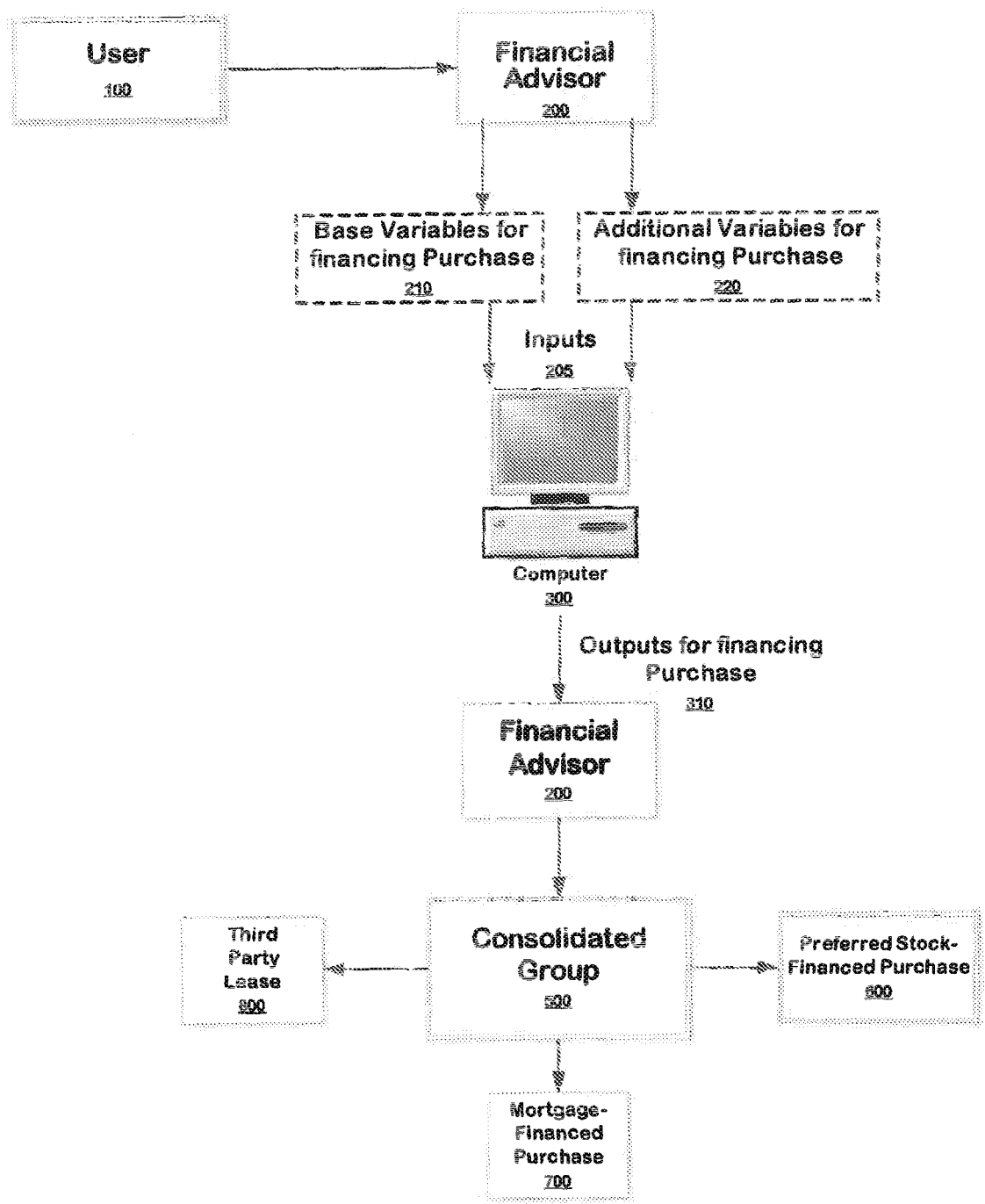
FIG. 2 illustrates a method of funding the purchase of a commercial property according to an embodiment of the present invention.

FIG. 2 illustrates an exemplary embodiment of funding the purchase of a financed property 30 through issuing preferred stock 20 by the issuer 630 to a third party investor (purchase embodiment). The method of funding the purchase or construction of financed property 30 comprises providing a computer 300 that is programmed to forecast multi-year financial results, receiving inputs 205 for computer calculation, generating outputs 310 representing the multi-year financial projections, and determining whether to issue stock to finance the purchase or construction of the financed property 30. As set forth below, the inputs 205 and outputs 310 define first and second electronic records stored in and/or output by the computer 300 and used for carrying out the present invention. The forecasting and generation of the outputs 310 may be carried out in the computer 300 using well known methods.

Figure 5:
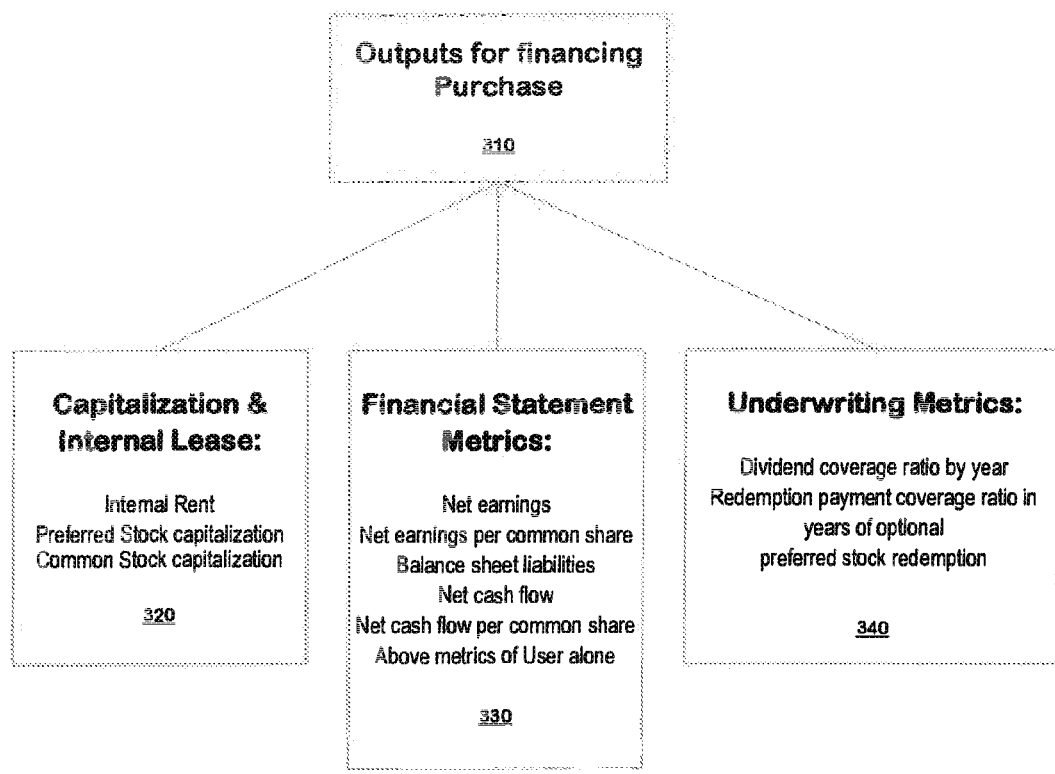
FIG. 5 illustrates computer outputs used in a method of funding the purchase of a commercial property according to an embodiment of the present invention.

In particular, computer 300 forecasts multi-year financial results that can be compared to financial results that would obtain if the user 100 were to (i) lease the financed property 30 from an unrelated third party (third party lease 800) or (ii) purchase the financed property 30 using in whole or part proceeds of a third party loan secured by the financed property 30 (mortgage financing purchase 700). Particularly, computer 300 determines and provides an electronic record (second electronic record) indicative of: (i) scheduled payments of preferred dividends 625 (see FIG. 10) on the preferred stock 20; (ii) optional periodic distributions in redemption of the preferred stock 20 (redemption payments) (see FIG. 3 at 250 and FIG. 5 at 340); and (iii) net cash flow (see FIG. 5 at 330) for such payments at a level sufficient to satisfy purchasers and underwriters of the preferred stock 20 and credit rating agencies that may rate the preferred stock 20. These may be determined by computer 300 using well known methods.

In order to adequately fund the preferred dividends 625, the redemption payments, and the cash reserves, computer 300 determines the dividend rate on the preferred stock 20 (dividend rate), the rate of internal rent 50, and the amount of equity capital to be contributed by the issuer's parent company 610 for the issuer's common stock. Specifically, the dividend rate is determined by market conditions that have been provided to the computer as a data record (for example, as a user input or an internet feed), intervals between resetting of the dividend rate based on a market index (also provided to the computer as a data record, for example, as a user input or an internet feed), and the credit quality of the user 100 and of any guarantor of internal rent 50 (again provided to the computer as a data record, for example, as a user input or an internet feed). The dividend rate resets, at defined intervals, to a rate expressed as a fixed spread over a designated market rate of interest (index rate), all as set forth in preferred stock indenture (indenture). These may be determined by computer 300 using well known methods.

The computer 300 uses the data records to determine the amount of preferred holder's equity (size of the preferred stock 20 offering) based on the square footage of the financed property 30, cost per square foot of the financed property 30, useful life of the financed property 30, amount of equity capital assumed to be contributed to the issuer 630 by its parent 610, and financing fees and costs to capitalize the issuer 630 and generate the internal lease 40. Moreover, the computer 300 calculates, using the data records, initial internal rent per square foot as the level monthly payment necessary to fully amortize an amount equal to the issuer's initial shareholders' equity, at the assumed rate of return derived from dividend rates and assumed redemption payments, over the assumed amortization period. Internal rent 50 may increase at reset dates in proportion to increases in the dividend rate on such dates, and said rental increases are forecasted by the computer 300. These may be determined by computer 300 using well known methods.

Figure 3:
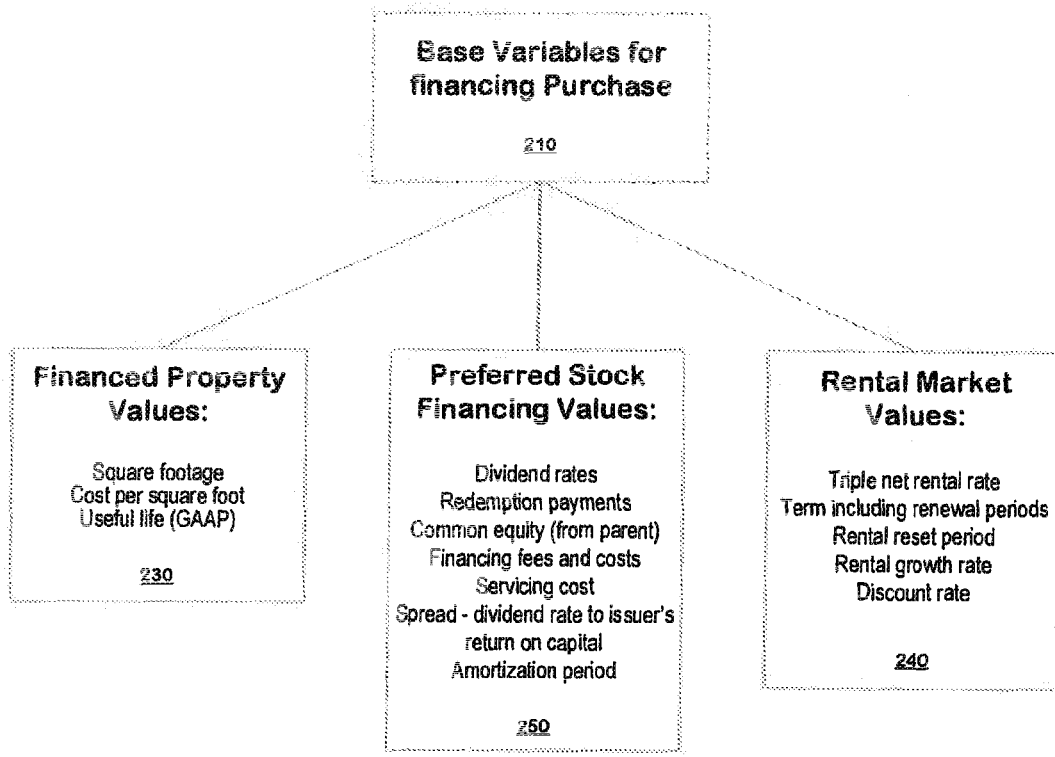
FIG. 3 illustrates base variables for the purchase of a commercial property according to an embodiment of the present invention.

The inputs 205 at the computer 300 are typically provided by a financial advisor 200. As shown in FIGS. 2 and 3, the inputs 205 define base variables for financing purchase 210, which represent financed property values 230, rental market values 240, and preferred stock financing values 250. Although most of the base variables for financing purchase 210 are determined by the financial advisor 200 based on market condition, in some embodiments, the financial advisor 200 may assist the user 100 to enter the base variables 210 into the computer 300. The base variables 210 and the additional variables 220, and their constituent components 230, 240, 250 and 260 are stored as the first electronic record.

The base variables for financing purchase 210 comprise: (1) the square footage, cost per square foot and useful life under GAAP of the financed property 30; (2) assumed market triple net rental rate (that is, rent net of taxes, insurance, utilities, maintenance and management fees), term including renewal periods, rental reset period, rental growth rate, and assumed discount rate applicable to a hypothetical third party lease of the financed property 30 to the user 100 (a third party lease 800); (3) assumed dividend rates at inception and at each scheduled date for resetting of such rate (each, a reset date), assumed redemption payments on each reset date (expressed as a percentage of preferred holder's initial equity), and the assumed reinvestment rate (that is, the interest rate earned on cash reserves of the issuer 630) as of each reset date; (4) tentative amount of equity capital assumed to be contributed to the issuer 630 by its parent 610 (expressed as a percentage of issuer's shareholders' equity); (5) assumed financing fees and costs to capitalize the issuer 630 and generate the internal lease 40 (expressed as a percentage of issuer's shareholder's equity); (6) assumed annual cost of servicing the preferred stock 20 (expressed as a percentage of issuer's initial shareholders' equity); (7) tentative assumed spread between the initial dividend rate and the rate of return on capital used to determine internal rent 50; and (8) amortization period used in computing internal rent 50. See FIG. 3.

Figure 4:
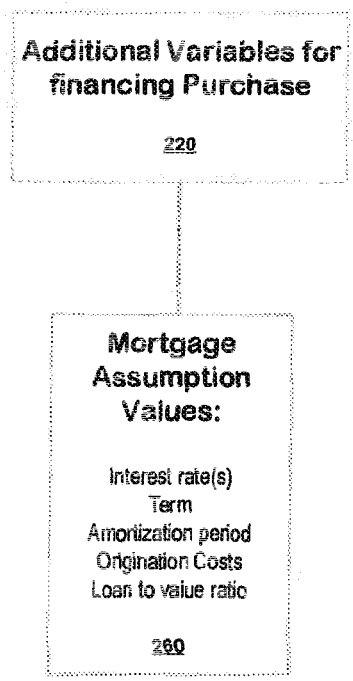
FIG. 4 illustrates additional variables for the purchase of a commercial property according to an embodiment of the present invention.

As shown in FIG. 2, the financial advisor 200 may enter into the computer 300 additional variables for financing purchase 220. The additional variables are specific to the preferred embodiments being employed. The additional variables for financing purchase 220, each of which pertains to a mortgage financing assumed to be the alternative to issuance of preferred stock (mortgage assumption values 260), comprises: (9) interest rates, initially and at refinancing; (10) term; (11) amortization period; (12) origination costs (expressed as a percentage of the amount financed); and (13) loan-to-value ratio. These additional variables for financing purchase 220 are typically used in the preferred embodiments whereby the consolidated group 500 uses the embodiment to purchase a building, land, or business equipment (collectively, purchase embodiments). See FIG. 4.

Generating outputs for financing purchase 310 is performed via the computer 300. Specifically, the computer 300 uses the base variables for financing purchase 210 and the additional variables for financing purchase 220 to generate outputs for financing purchase 310 that represent a multi-year financial projection over the expected term of the preferred stock 20 (for example, 15 years). As mentioned, the outputs define a second electronic record that is stored in and output by the computer 300 and that is used by a financial advisor. See FIG. 2.

The outputs 310 for financing purchase 310 represent: (i) capitalization and internal lease 320; (ii) financial statement metrics 330; and (iii) underwriting metrics 340. Specifically, the outputs for financing purchase 310 comprises: (1) initial rate of internal rent; (2) required amounts of preferred stock and common stock capitalization; (3) issuers' projected distributions on common stock by year; and (4) effect on the consolidated group's net earnings, net cash flow, and balance sheet liabilities of using the present embodiment, when compared to a third party lease 800 of, or a mortgage-financed purchase 700 of, the financed property 30 (as applicable). See FIG. 5. Moreover, the outputs for financing purchase 310 may include an effect on the user's net earnings, net cash flow, and balance sheet liabilities of using the present embodiment, when compared to a third party lease 800 of, or a mortgage-financed purchase 700 of, the financed property 30. The effect on the user's financial statement is determined on a stand-alone basis by the computer 300 based on the first electronic record. The output for financing purchase 310 further comprises annual coverage ratios calculated by the computer 300 (further explained below) for the payment of preferred dividends 625 and redemption payments. See FIG. 5. These outputs for financing purchase 310 and additional effects on the user's financial statement may be determined by computer 300 using well known methods.

The financial advisor 200 then establishes target levels of the following metrics to be achieved by the present embodiment: (A) minimum annual coverage ratio for the issuer 630 (i.e., annual ratio of the issuer's net cash flow before preferred dividends 625 to the level debt service payment required to fully amortize par value of the preferred stock 20 over the projected term of the preferred stock 20, at an interest rate equal to the dividend rate); (B) minimum redemption coverage ratio (i.e., the ratio as of a redemption payment date of the issuer's cash available for redemption payments to such redemption payment); (C) percentage improvement in net earnings per common share as a result of using the present embodiment, measured in the first full year of operations and as the net present value of annual improvements over the projected term of the preferred stock 20; and (D) percentage improvement in net cash flow, measured in the first full year of operations and as the net present value of annual improvements over the projected term of the preferred stock 20.

The financial advisor 200 then runs sequential iterations on the computer 300, in which values for controllable variables—for example, those described in base variables for financing purchase (4), (7) and (8) and the redemption payments described in base variables for financing purchase (3)—are changed to achieve minimum market-required metrics such as coverage ratios and to optimize user-desired metrics such as improvements in earnings per common share. Once the financial advisor 200 arrives as the iteration or small number of iterations that achieve the minimum required metrics and best achieve user-desired metrics, it presents the user 100 with those results. The outputs for financing purchase 310 with the minimum market required metrics that best achieve user-desired metrics may be determined by computer 300 using well known methods.

In order to determine whether to issue common stock and preferred stock 20 to fund the issuer's purchase of the financed property 30 (preferred stock financed purchase 600), the consolidated group 500 compares the outputs for financing purchase 310 with financial results attributable to leasing the financed property 30 from an unrelated third party (third party lease 800) or purchasing the financed property 30 using proceeds of a third party loan secured by the financed property 30 (mortgage financed purchase 700). Based on the comparison, the consolidated group 500 chooses among: (i) acquiring the financed property 30 through preferred stock financed purchase 600 pursuant to the present embodiment; (ii) obtaining use of the financed property 30 through a third party lease 800; or (iii) acquiring the financed property 30 through a mortgage-financed purchase 700. See FIG. 2.

Once the consolidated group 500 chooses the option of acquiring the financed property 30 through preferred stock financed purchase 600, the consolidated group 500 funds the issuer's purchase or construction of the financed property 30 by issuance of common stock to its parent company 610 in an amount that preserves consolidation between the issuer 630 and the parent company 610, and by issuance of preferred stock 20 to shareholders outside the consolidated group 500. The net proceeds of both issuances are used to purchase or construct the financed property 30 and establish cash reserves of the issuer 630 for the payment of preferred dividends 625 or redemption payments. See FIG. 11.

The preferred stock 20 is subject to an optional redemption by the issuer 630 prior to expiration of a useful life of the financed property 30. Moreover, as long as any preferred stock 20 is outstanding, covenants in the indenture prohibit the issuer 630 from selling or encumbering the financed property 30 or from renewing the internal lease 40 at less than fair market value rent (determined at the time of renewal), in each case without approval of preferred holders 620 holding a majority of the preferred stock 20. The covenants are expected to incent the issuer 630 to fully redeem the preferred stock 20 on the date of the last scheduled optional redemption payment. The internal lease 40 between the issuer 630 and the user 100 requires payment of the rent in an amount sufficient to fund the issuer's payment of dividends on the preferred stock 20.

Figure 6:
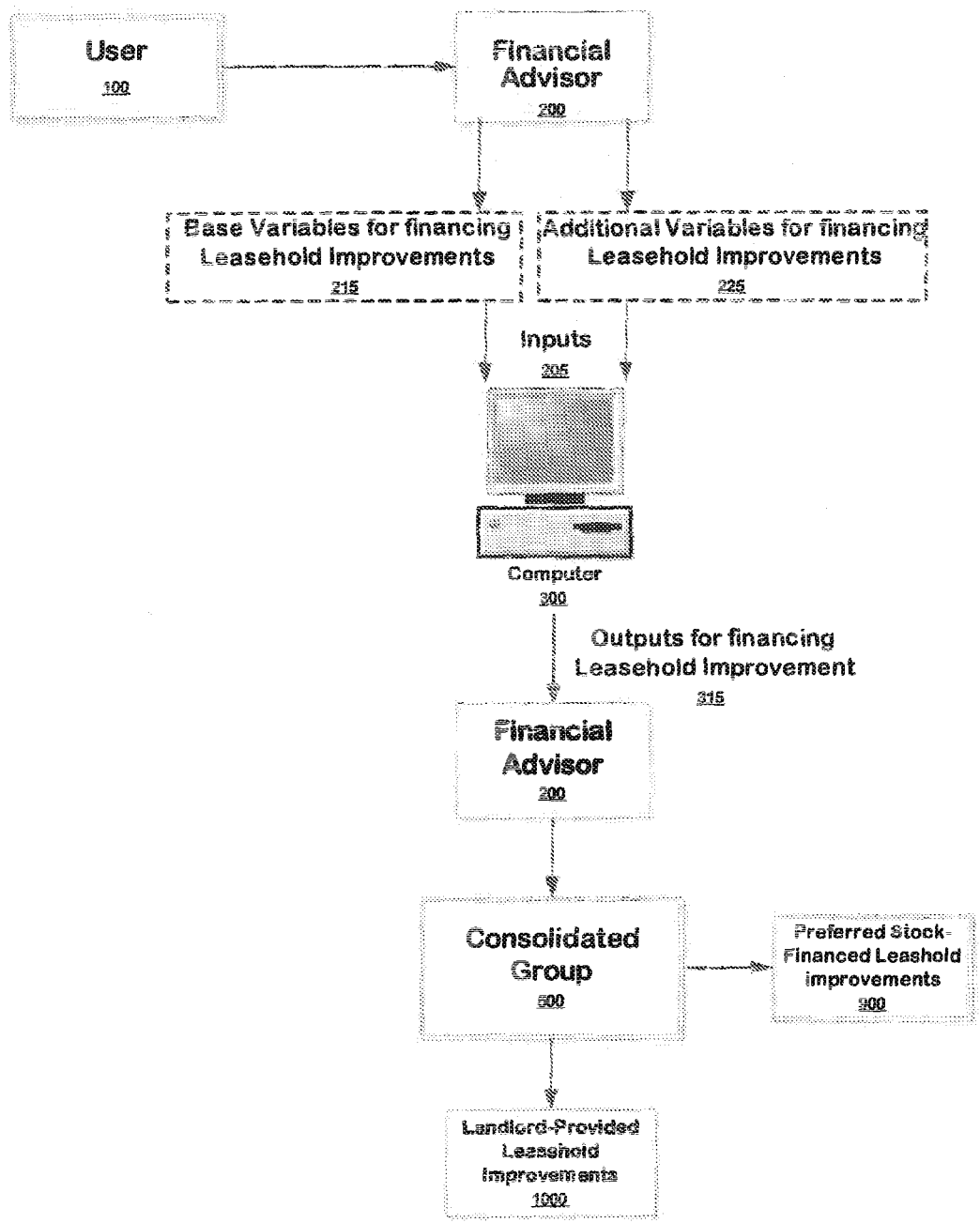
FIG. 6 illustrates a method of funding the construction of leasehold improvements of a commercial property according to an embodiment of the present invention.
Figure 7:
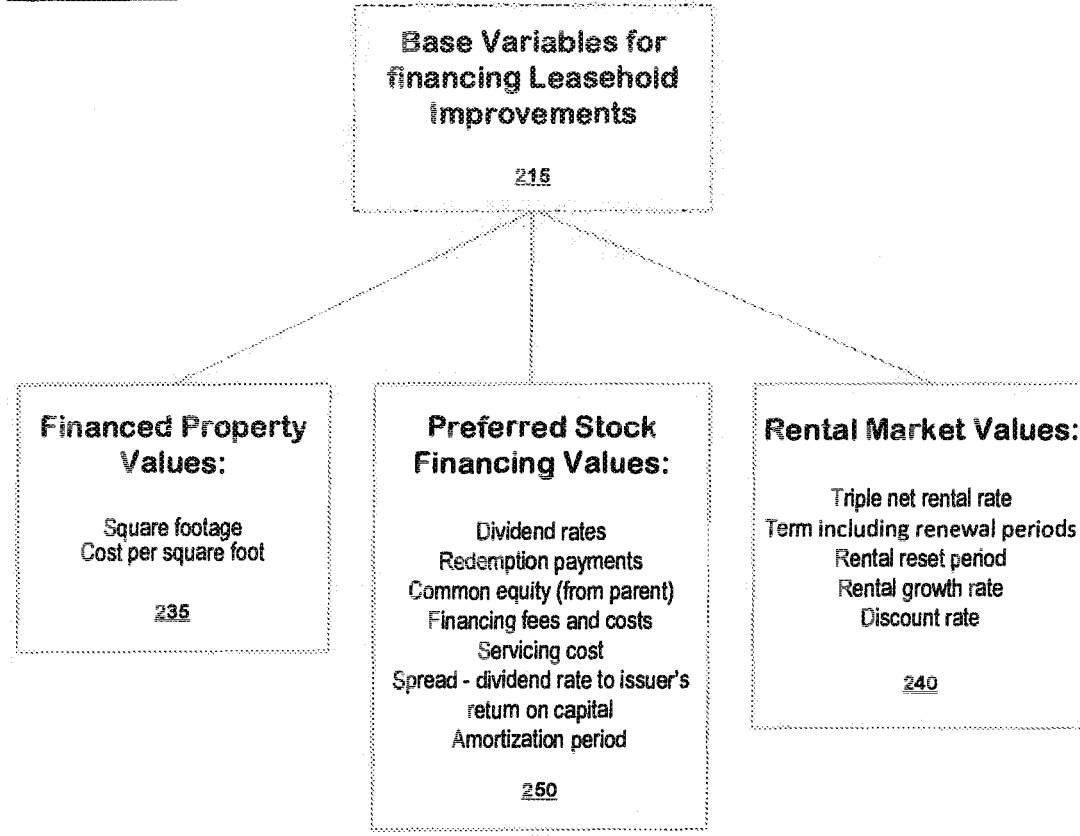
FIG. 7 illustrates base variables for the construction of leasehold improvements according to an embodiment of the present invention.

FIG. 6 illustrates an exemplary embodiment of funding a construction of leasehold improvements in commercial space to be leased by the user 100 under a third party lease (TI embodiment). In the present embodiment, the computer 300 receives the base variables for financing leasehold improvements 215 and the additional variable for financing leasehold improvements 225. The financial advisor 200 may enter into the computer 300 the base variables for financing leasehold improvements 215 as described above and as shown in FIG. 7, and the additional variable for financing leasehold improvements 225. As described above, the base variables for financing leasehold improvements 215 represent financed property values 235, rental market values 240, and preferred stock financing values 250. See FIG. 7.

Figure 8:
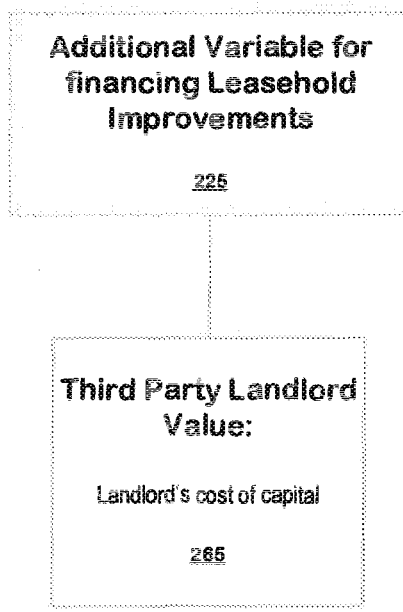
FIG. 8 illustrates an additional variable for financing the construction of leasehold improvements according to an embodiment of the present invention.

The additional variable for financing leasehold improvements 225 pertain to the third party lease or to an alternate version of the third party lease under which the third party lessor (landlord 910) funds all leasehold improvements, representing third party landlord value 265. Specifically, the additional variable for financing leasehold improvements 225 comprises landlord's cost of capital. See FIG. 8.

Figure 9:
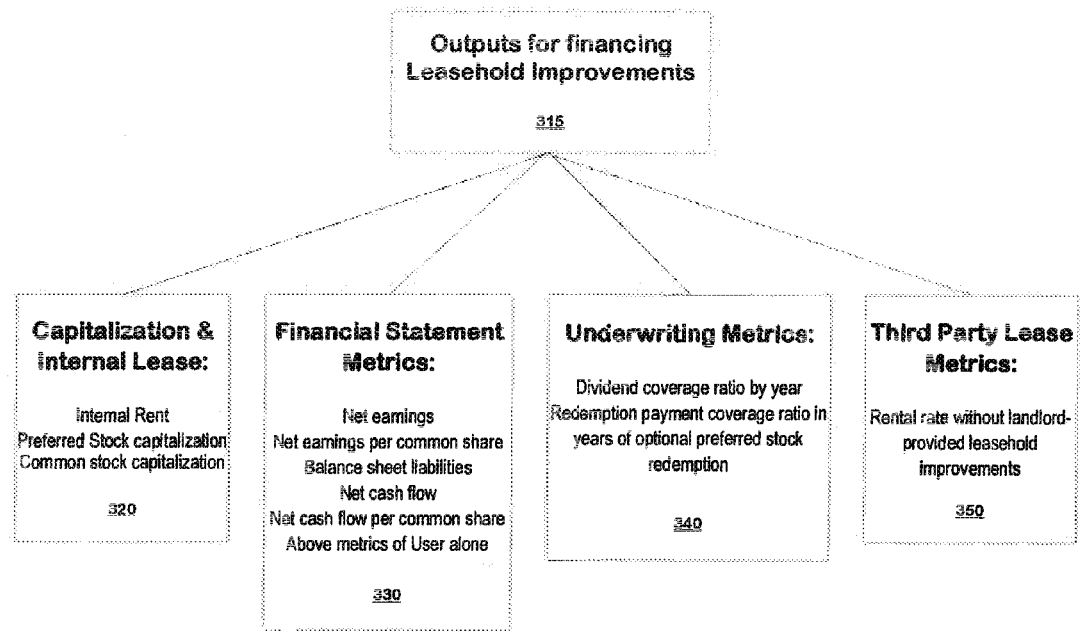
FIG. 9 illustrates computer outputs used in a method of funding the construction of leasehold improvements according to an embodiment of the present invention.

As shown in FIG. 6, outputs for financing leasehold improvements 315 are generated by the computer 300. Specifically, the computer 300 uses the base variables for financing leasehold improvements 215 and the additional variable for financing leasehold improvements 225 to generate a multi-year financial projection over the expected term of the preferred stock 20. The outputs for financing leasehold improvements 315 include numeric values representing: (i) capitalization and internal lease 320; (ii) financial statement metrics 330; (iii) underwriting metrics 340; and (iv) third party lease metrics 350. In addition to the outputs for financing purchase 310 listed above, the outputs for financing leasehold improvements 315 further comprises a rental rate without landlord-provided leasehold improvements. See FIG. 9. These outputs for financing leasehold improvements 315 may be determined by computer 300 using well known methods.

The computer 300 projects the effect on the consolidated group's 500—and the user's 100—net earnings, net cash flow and balance sheet liabilities of using the present embodiment to finance construction of its own improvements, when compared to the corresponding financial results that would obtain if the user 100 entered into a third party lease that included landlord-provided leasehold improvements. The computer 300 may also be used to demonstrate achievement of the desired coverage ratios (for coverage of dividends and redemption payments) by year. These projections and achievement of the desired coverage ratios may be determined by computer 300 using well known methods.

Based on the foregoing outputs for financing leasehold improvements 315, the consolidated group 500 determines whether it will employ the present embodiment to raise funds to construct improvements (preferred stock financed leasehold improvements 900) or enter into a third party lease that includes landlord-provided improvements (landlord-provided leasehold improvements 1000).

Figure 10:
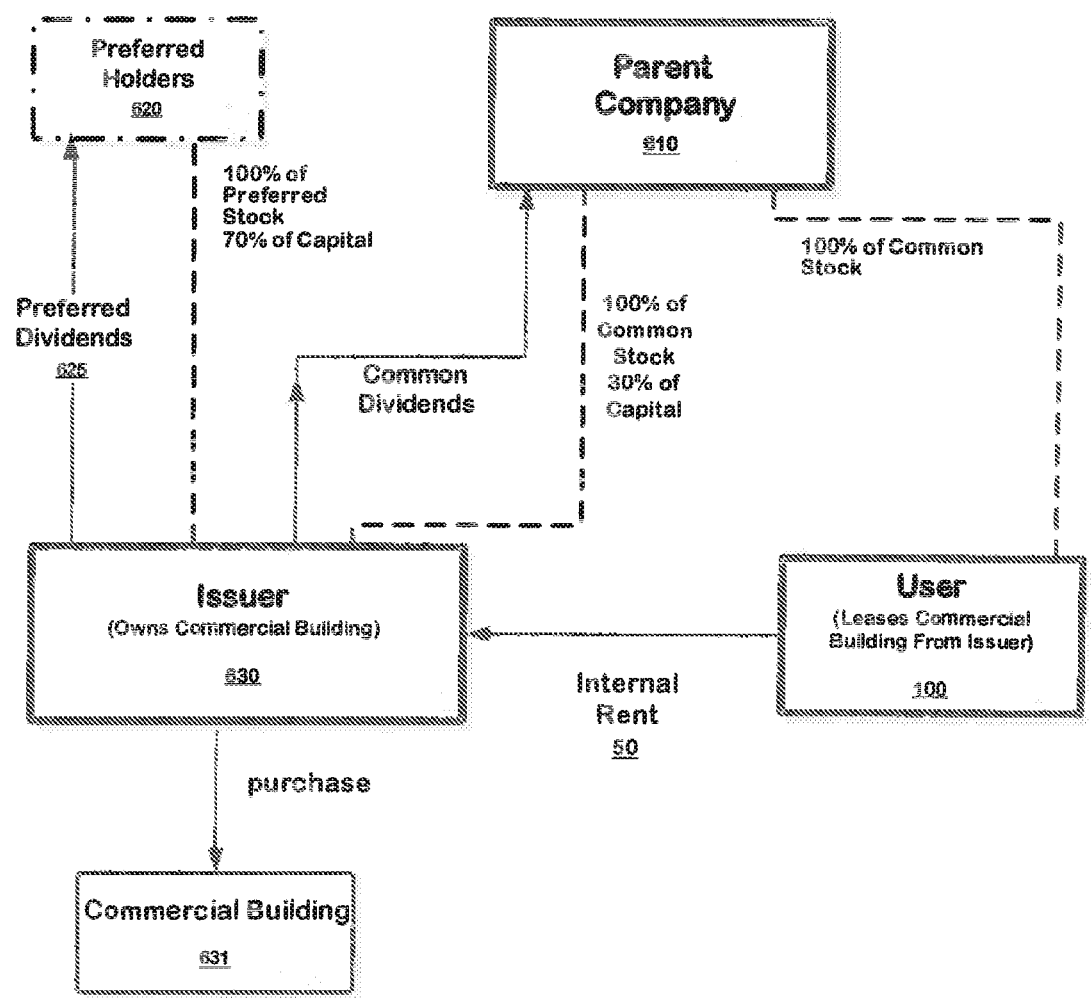
FIG. 10 illustrates a method of issuing preferred stock and common stock to fund the acquisition of a commercial building according to an embodiment of the present invention.
Figure 11:
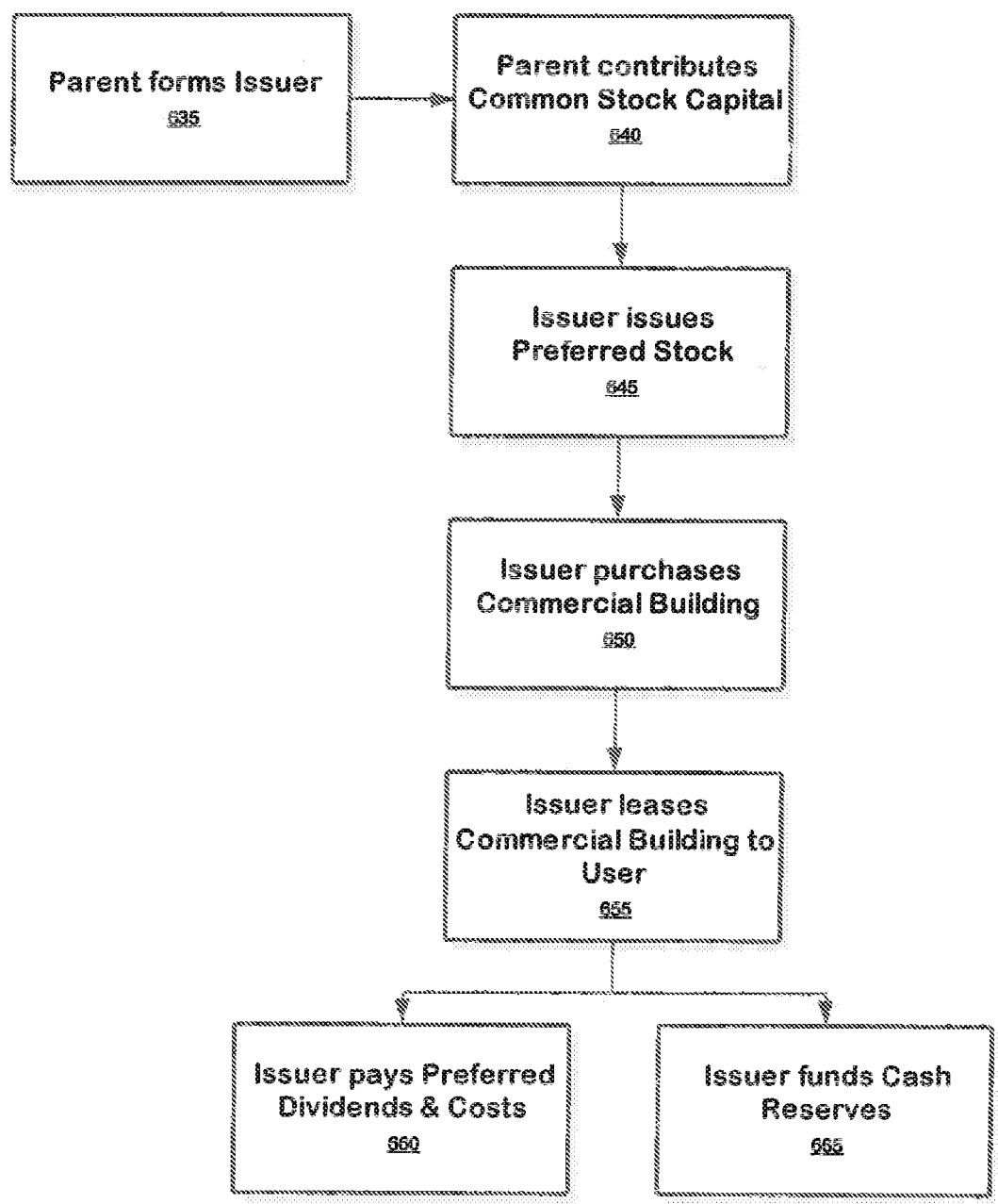
FIG. 11 illustrates a method of issuing preferred stock and common stock to fund the acquisition of a commercial building according to an embodiment of the present invention.

FIGS. 10 and 11 illustrate an exemplary embodiment of funding an acquisition of a commercial building 631. As shown in FIG. 10, a consolidated group 500 may use the present embodiment to finance acquisition of an office, retail, warehouse or industrial building (each, a commercial building 631) for use by the user 100. In this embodiment, the issuer 630 purchases the commercial building 631 and leases it to the user 100 for internal rent 50 at a rate determined by the computer 300.

The computer 300 initially determines the projected effect on net earnings, net cash flow, and balance sheet liabilities of the consolidated group 500 that result from use of the present embodiment, when compared to a third party lease 800 between the user 100 and an unaffiliated landlord. If, following such analysis, the consolidated group 500 chooses to reject the third party lease 800, it further chooses between financing a purchase of the commercial building 631 with preferred stock 20 pursuant to the present embodiment and financing such purchase with a commercial mortgage. The consolidated group's choice is informed by the respective effects of those financing alternatives on net earnings, net cash flow, and balance sheet liabilities forecasted by the computer 300. These projections and effects may be determined by computer 300 using well known methods.

As shown in FIG. 11, if the consolidated group 500 chooses preferred stock financed purchase 600, the parent company 610 forms (635) the issuer 630 as a special-purpose finance subsidiary and contributes (640) to it all or nearly all of the common stock capital required as determined by the computer 300 (an unrelated party may contribute the rest). The issuer 630 then issues (645) preferred stock 20 to outside investors (preferred holders 620) in the required amount, also as determined by the computer 300. Any shortfall in funding caused by issuance of the preferred stock 620 at less than par value is made up by issuing additional common stock to the parent company 610. See FIG. 11. These amounts of capital and stocks may be determined by computer 300 using well known methods.

Using the net proceeds of the common stock and preferred stock issues, the issuer 630 purchases (650) the commercial building 631. The issuer 630 then leases (655) the commercial building 631 to the user 100 for internal rent 50, as determined by the computer 300. The issuer 630 uses the internal rent 50 received to pay (660) scheduled preferred dividends 625 and annual servicing costs, and to fund (665) cash reserves for the payment of future preferred dividends and redemption payments per the indenture, the amount of optional redemption payments having been determined by the computer 300. See FIG. 11. These amounts of rents, payments, and costs may be determined by computer 300 using well known methods.

When the cash reserves exceed threshold levels established in the indenture, the issuer 630 may distribute such excess cash to the parent company 610 and, if applicable, any other holders of the common stock. The dividend rate will reset at defined intervals to an amount determined by a fixed spread over the index rate, all as set forth in the indenture. For example, the dividend rate may reset every five years. Correspondingly, internal rent 50 may reset every five years based the percentage increase in the dividend rate.

In some embodiments, the consolidated group 500 uses the present embodiment to fund the purchase of business equipment. In other embodiments, the consolidated group 500 uses the present embodiment to fund the acquisition of land for business use.

Figure 12:
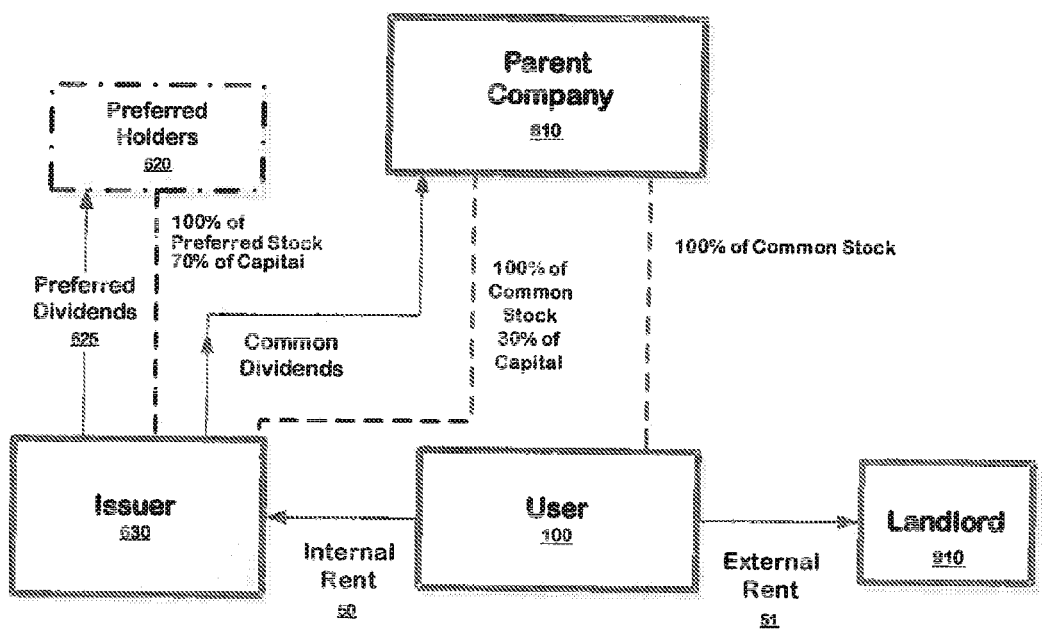
FIG. 12 illustrates a method of funding the construction of leasehold improvements of a commercial space according to an embodiment of the present invention.
Figure 13:
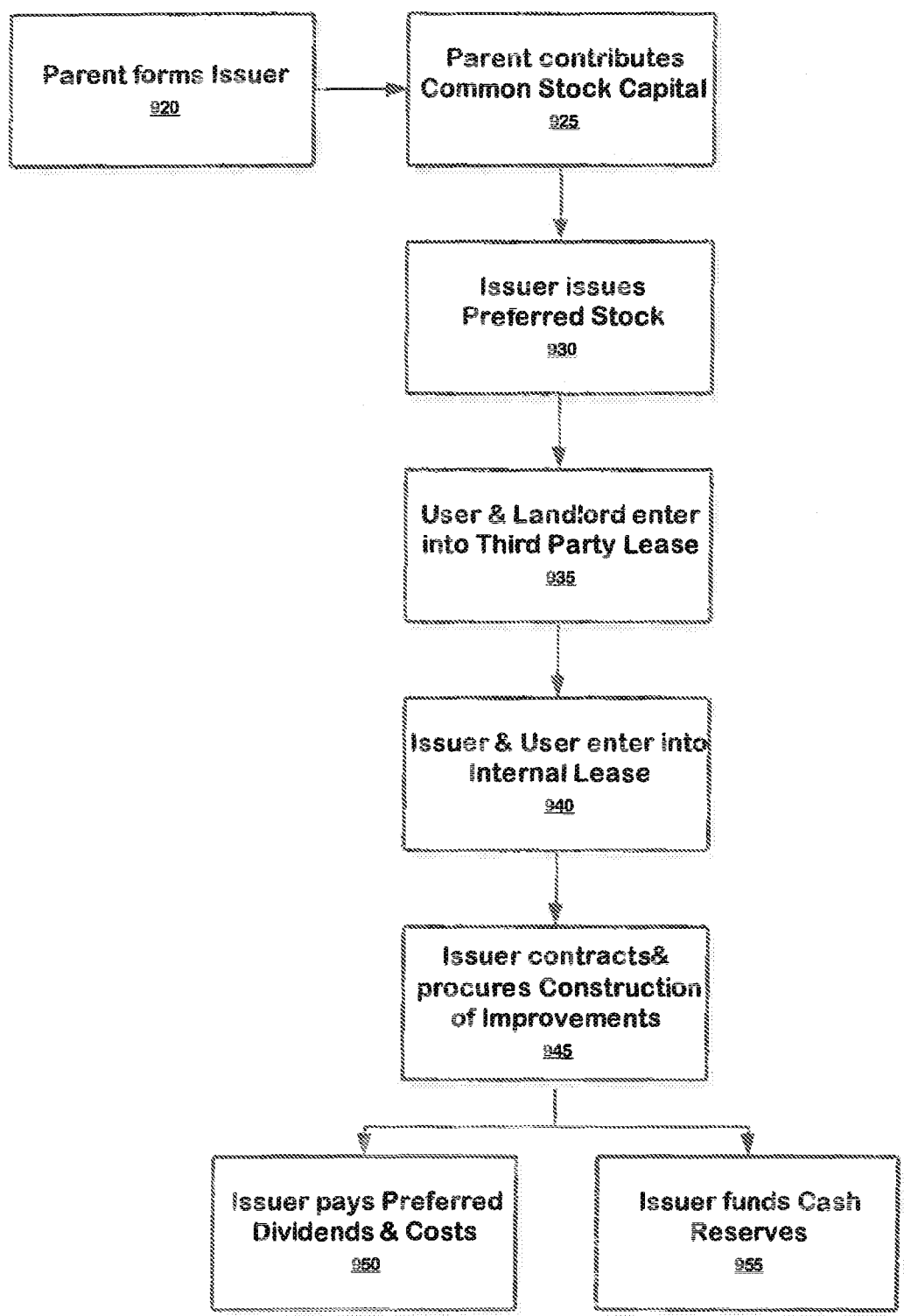
FIG. 13 illustrates a method of issuing preferred stock and common stock to fund the construction of leasehold improvements in commercial space according to an embodiment of the present invention.

FIGS. 12 and 13 illustrate an exemplary embodiment of funding a construction of leasehold improvements of a commercial space. A consolidated group 500 may use the present embodiment to construct its own leasehold improvements in office, retail or industrial space (commercial space) to be leased by the user 100 from an unaffiliated owner (landlord 910) pursuant to a third party lease, as illustrated in FIG. 12. In this embodiment, the user 100 employs the computer 300 to determine the reduction in rental rate under the third party lease (external rent 51) that is likely to be achieved by leasing the space "as is"—that is, without landlord-provided improvements 1000. These rates may be determined by computer 300 using well known methods. Moreover, the user 100 may employ this information to negotiate with the landlord 910 a lower rental rate in exchange for waiving landlord-provided improvements 1000.

As shown in FIG. 13, if the consolidated group 500 chooses preferred stock financed leasehold improvements 900, the parent company 610 forms (920) the issuer 630 as a special-purpose finance subsidiary and contributes (925) to it all or nearly all of the common stock capital required, as determined by the computer 300. An unrelated shareholder may own a small percentage of the common stock (e.g., 5%) but not so much as to prevent inclusion of the issuer 630 in the parent's consolidated group 500. The issuer 630 then issues (930) preferred stock 20 to outside investors (preferred holders 620) in the required amount as determined by the computer 300. Any shortfall in funding caused by issuance of the preferred stock 20 at less than par value is made up by issuing additional common stock to the parent company 610. See FIG. 13. These amounts of capital and stocks may be determined by computer 300 using well known methods.

After the issuance of the preferred stock 20, the user 100 and the landlord 910 enter into (935) the third party lease whereby the user 100 leases the commercial space on an "as is" basis. The issuer 630 and the user 100 then enter into (940) the internal lease, whereby the issuer 630 leases the to-be-built improvements to the user 100 under terms determined by the computer 300. See FIG. 13. In some embodiments where the third party lease has renewal options, the internal lease 40 would be for a term equal to the maximum length of the third party lease—that is, with all renewal options exercised—in which case the internal lease 40 will give the user 100 an option to terminate the internal lease 40 upon termination of the third party lease, provided the user 100 pays prepaid rent for the remaining term of the internal lease 40 under a pre-agreed defeasance formula. Internal rent 50 is a recourse obligation of the user 100 and may be further secured by any combination of the following: a parent company's guaranty, the guaranty of another person, a pledge of personal property included in the leasehold improvements, or a pledge of the user's leasehold interest in the third party lease. The internal lease 40 is a bondable-type lease in that internal rent 50 is payable in all events—e.g., even after termination of the third party lease.

Using net proceeds of the common stock and preferred stock issues, the issuer 630 contracts for and procures (945) construction of the leasehold improvements, which it then leases to the user 100 for internal rent. The issuer 630 then uses internal rent (50) received to pay (950) scheduled preferred dividends and annual servicing costs, and to fund (955) cash reserves for the payment of future preferred dividends and optional redemption payments per the indenture, the amount of such redemption payments having been determined by the computer 300. See FIG. 13. When cash reserves exceed threshold levels established in the indenture, the issuer 630 may distribute such excess cash to the parent company 610 and, if applicable, other holders of common stock.

The dividend rate may reset at defined intervals to a rate expressed as a fixed spread over a designated market rate of interest (index rate), all as set forth in the indenture. For example, where the third party lease is for an initial term of five years and provides two renewal options of five years each, the dividend rate may reset in the first year of each such renewal term. Correspondingly, internal rent 50 may reset at the beginning of each such renewal term based on the concurrent percentage increase in external rent 51 or the percentage increase in the dividend rate. Such increased internal rent would provide an additional source for paying a higher dividend rate. The present embodiment may also be used to finance an amount of leasehold improvements in excess of the amount of landlord-provided improvements available in the market.

In other embodiments, an investment bank, mutual fund sponsor, or other financial company may purchase multiple issues of the preferred stock 20 from a plurality of issuers that belong to different consolidated groups, and ultimately transfer the pool holding such issues to a closed-end mutual fund or unit investment trust that issues shares or units to outside investors. This embodiment has the advantage of diversifying investments and creating liquidity for the outside investors.

In other embodiments, an unrelated servicer of the issuer 630 may be hired to: manage payment of preferred dividends 625, redemption payments, and distributions with respect to the common stock; invest reserved cash of the issuer 630; and monitor and enforce compliance with the indenture. The servicer may own a small portion of the common stock, though not so much as to prevent the issuer 630 from remaining a member of the consolidated group 500.

What is claimed:

1. A method for an issuer to fund one of a purchase or construction of a financed property to be leased to a user, through issuing preferred stock by the issuer to third party investors, wherein the issuer, the user, and a parent company are within a consolidated group, comprising the acts of:

a) providing a computer programmed to forecast multi-year financial results of the consolidated group;

b) receiving, at the computer, the following inputs:
  i) a square footage and a cost per square foot of the financed property;
  ii) a market net rental rate for the financed property;
  iii) a period for resetting rents relating to a third party lease;
  iv) a market rental growth rate;
  v) a discount rate;
  vi) a preferred stock dividend rate;
  vii) an amount of equity capital to be contributed to the issuer by one or more entities within the consolidated group; and
  viii) financing fees and costs for issuing the preferred stock;

the inputs being stored as a first electronic record;

c) generating, based on the first electronic record, via the computer, the following outputs:
  i) internal rents to be paid by the user under an internal lease between the user and the issuer; of the preferred stock;
  ii) an amount of capitalization required to be provided through issuance of the preferred stock;
  iii) an effect of each of net earnings, net cash flow, and balance sheet liabilities, collectively defining financial metrics of the consolidated group, resulting from funding the purchase or construction of the financed property through the issuance of the preferred stock, in comparison to a corresponding effect of each of a third party lease or a mortgage financing; to obtain use of the financed property;

the outputs being stored as a second electronic record;

d) comparing, at the computer, the financial metrics resulting from each of (i) issuing common stock to the parent company and preferred stock to investors outside the consolidated group and using proceeds of the stock issuance to fund the issuer's purchase or construction of the financed property, (ii) leasing the financed property from an unrelated third party, or (iii) purchasing the financed property using proceeds of a third party loan secured by the financed property;

e) determining, based on the results of the comparison at step (d) which of (d)(i), (d)(ii) or (d)(iii) to employ;

wherein, in response to a determination made in step (e) to employ step (d)(i), a decision is made to:

grant issuer one or more options to redeem the preferred stock prior to an expiration of a useful life of the financed property;

require, under the internal lease between the issuer and the user, payment of the internal rents in an amount sufficient to fund the issuer's payment of dividends on the preferred stock; and grant holders of the preferred stock the right to enforce a prohibition, applicable while the preferred stock is outstanding, against sale or encumbrance of the financed property without either
  (i) consent of a majority-in-interest of shareholders of the preferred stock, or,
  (ii) placing the issuer's proceeds from the sale or encumbrance of the financed property in a trust or restricted account for the benefit of the holders of the preferred stock.

2. The method of claim 1, further comprising providing the following inputs:
  a useful life under Generally Accepted Accounting Principles (GAAP) of the financed property;
  a redemption payments with respect to the preferred stock;
  a reinvestment rate for funds of the issuer;
  assumed costs of the preferred stock issuance and of originating the internal lease;
  costs of servicing stock of the issuer;
  a rate of return on capital used to determine the internal rent under the internal lease;
  a spread between the dividend rate on said preferred stock and said rate of return on capital; and
  an amortization period for calculating the internal rent.

3. The method of claim 1, further comprising providing the following outputs:
  future increases or decreases in the preferred stock dividend rate;
  future increases in the internal rent;
  coverage ratios for payment of the preferred stock dividends, either at inception or annually;
  coverage ratios for payment in redemption of the preferred stock on one or more optional redemption dates;
  an effect of net earnings under GAAP, net cash flow, and balance sheet liabilities under GAAP of the user on a stand-alone basis, in comparison to a corresponding effect of one of a third party lease or a mortgage financing; and
  an effect of earnings per share or per common share under GAAP, balance sheet liabilities per share or per common share under GAAP, and net cash flow per share or per common share, with respect to the consolidated group and in comparison to a corresponding effects of a third party lease or a mortgage financing.

4. The method of claim 1, further comprising iteratively changing the inputs so as to provide iterative outputs corresponding to the iteratively changed inputs, the iterative outputs determining minimum coverage ratios for the dividends or the redemption payments with respect to the preferred stock.

5. The method of claim 1, wherein the financed property is one of a commercial building, a commercial space, or leasehold improvements on a non-residential real property, further comprising leasing the leasehold improvements by the issuer to the user and leasing the non-residential real property by the user from a lessor outside the consolidated group.

* * * * *